(12) United States Patent
Vandellos et al.

(10) Patent No.: US 12,253,048 B2
(45) Date of Patent: Mar. 18, 2025

(54) FASTENING OF AN EXHAUST CONE IN A TURBOMACHINE TURBINE

(71) Applicant: SAFRAN CERAMICS, Le Haillan (FR)

(72) Inventors: Thomas Vandellos, Moissy-Cramayel (FR); Benoit Carrere, Moissy-Cramayel (FR); Eric Conete, Moissy-Cramayel (FR); Jean-Philippe Joret, Moissy-Cramayel (FR); Vincent Devanlay, Moissy-Cramayel (FR); Clément Marie Benoît Roussille, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/251,965

(22) PCT Filed: Nov. 4, 2021

(86) PCT No.: PCT/FR2021/051948
§ 371 (c)(1),
(2) Date: May 5, 2023

(87) PCT Pub. No.: WO2022/096832
PCT Pub. Date: May 12, 2022

(65) Prior Publication Data
US 2023/0407814 A1 Dec. 21, 2023

(30) Foreign Application Priority Data

Nov. 5, 2020 (FR) .......................................... 2011376
Nov. 5, 2020 (FR) .......................................... 2011377

(51) Int. Cl.
*F02K 1/04* (2006.01)
*F02K 1/82* (2006.01)

(52) U.S. Cl.
CPC ................ *F02K 1/04* (2013.01); *F02K 1/827* (2013.01)

(58) Field of Classification Search
CPC ... F02K 1/00; F02K 1/04; F02K 1/827; F02K 1/80; F02K 1/08; F02K 1/34; F02K 3/02; F01D 25/30
See application file for complete search history.

(56) References Cited

U.S. PATENT DOCUMENTS 3,807,639 A * 4/1974 Soligny ..................... F02K 1/08
239/265.19
5,908,159 A * 6/1999 Rudolph ................. F02K 1/383
239/265.17

(Continued)

FOREIGN PATENT DOCUMENTS

EP   3 683 429 A1   7/2020
FR   2 916 018 A1   11/2008

(Continued)

OTHER PUBLICATIONS

International Search Report mailed Feb. 2, 2022, issued in corresponding International Application No. PCT/FR2021/051948, filed Nov. 4, 2021, 6 pages.

(Continued)

*Primary Examiner* — David E Sosnowski
*Assistant Examiner* — Maxime M Adjagbe
(74) *Attorney, Agent, or Firm* — CHRISTENSEN O'CONNOR JOHNSON KINDNESS PLLC

(57) ABSTRACT

An assembly for a turbomachine with a longitudinal axis having an exhaust cone with an outer annular wall for the flow of a primary airflow and an annular box arranged radially inside the outer annular wall, an exhaust casing arranged upstream of and connected to the exhaust cone. One end of the outer annular wall or one end of the annular (Continued)

box may be free to move relative to and have no mechanical connection with the exhaust cone or the exhaust casing.

7 Claims, 15 Drawing Sheets

(56) References Cited

U.S. PATENT DOCUMENTS

2015/0083822 A1\* 3/2015 Mecuson ............... F02K 1/80
                                                    239/265.11
2016/0312662 A1   10/2016 Byrne et al.

FOREIGN PATENT DOCUMENTS

WO    WO-2013121155 A1 \* 8/2013   ............. F01D 25/30
WO       2020/030858 A1    2/2020

OTHER PUBLICATIONS

Written Opinion mailed Feb. 2, 2022, issued in corresponding International Application No. PCT/FR2021/051948, filed Nov. 4, 2021, 4 pages.

\* cited by examiner a b a b a b     c d a b

FASTENING OF AN EXHAUST CONE IN A TURBOMACHINE TURBINE

CROSS-REFERENCE TO RELATED APPLICATIONS

This application is a National Stage of International Application No. PCT/FR2021/051948, filed Nov. 4, 2021, which claims priority to French Patent Application No. 2011376, filed Nov. 5, 2020, and French Patent Application No. 2011377, filed Nov. 5, 2020, the entire disclosures of which are hereby incorporated by reference in their entirety for all purposes.

TECHNICAL FIELD OF THE INVENTION

The invention relates to means for fastening an exhaust cone in a turbomachine turbine, in particular means for fastening an exhaust cone made of a ceramic matrix composite.

PRIOR ART

The present disclosure relates to an assembly located at the rear (downstream end) of an aircraft turbojet engine to optimise the flow of hot gases expelled by the turbojet engine, and possibly absorb at least part of the noise generated by the interaction of these hot gases, coming from the engine inner portions (combustion chamber, turbine(s)), with ambient air and with the cold airflow expelled by the fan of the turbojet engine.

More specifically, the present disclosure relates to the connection between what is often referred to as the "exhaust cone" and, located just upstream, a gas outlet from the turbojet engine.

Typically, the exhaust cone is completed (surrounded) by a so-called "primary nozzle" portion. The "exhaust cone" is intended to be positioned downstream of the turbine (portion) of the turbojet engine, around which the primary nozzle is placed concentrically. Both of the exhaust cone and the primary nozzle are fastened on a casing of the turbojet engine by a system for fastening by flanges.

An assembly for an aircraft turbojet engine represented in FIG. 1 is known, comprising:
  a gas ejection central element, annular around an axis (X) and adapted so that gas is ejected by the turbojet engine therearound, from upstream to downstream, and
  a connecting flange interposed between, upstream, a so-called metal outlet of a turbojet engine and, downstream, the central element, to connect them together.

The aforementioned axis X is the longitudinal axis, or axis of rotation, of the turbomachine, in particular of the fan 20 and of the moving blades of the engine 12.

The gas ejection central element may correspond to the aforementioned exhaust cone (denoted 1 hereinafter), or at least to the upstream portion 1a hereinafter.

A conventional exhaust cone 1 is represented in FIG. 1, wherein the upstream (AM) and downstream (AV) of the structure along an engine axis (axis X hereinabove) are located respectively on the left and on the right of the figure.

More generally, an aircraft turbojet engine 10 is illustrated in FIG. 1, the central portion of which, forming the gas turbine engine 12, is mounted within an engine nacelle assembly 14, as is typical of an aircraft designed for subsonic operation, such as a turboprop or turbofan engine. In general, the nacelle assembly 14 comprises an engine nacelle 16 and a fan nacelle 18 surrounding a fan 20 located axially upstream of the engine 12.

Axially in the downstream portion, the engine 12 comprises at least one turbine which may be a low-pressure turbine and, further downstream, an exhaust casing 22 comprising an inner annular shroud 22a and an outer annular shroud 22b delimiting therebetween a downstream portion of the primary annular flow path 24 in which flow the combustion gases coming from the combustion chamber of the engine 12. FIG. 2 shows a schematic view of an enlargement of the portion II of FIG. 1.

Axially, the inner annular shroud 22a is connected, at its downstream end, to an upstream portion 1a of the exhaust cone 1, which may comprise the upstream portion 1a, with a substantially cylindrical shape, and a downstream portion 1b with a conical shape. In addition, an acoustic box 3 is arranged inside the exhaust cone 1 to reduce the noise pollution of the exhaust gases. The acoustic box 3 is connected at its upstream end to the inner annular shroud 22a and at its downstream end to the downstream portion of the exhaust cone.

In practice, it is still difficult to connect together the aforementioned metal outlet of the turbojet engine, which may be said inner annular shroud 22a, and said central element, which may be said upstream portion 1a of the exhaust cone 1. Indeed, at least one portion of the exhaust cone is made of a material different from the exhaust casing and/or from the other portion of the exhaust cone or at least one portion of the exhaust cone is subjected to temperatures different from the temperatures to which the exhaust casing and/or the other portion of the exhaust cone are subjected, which induces thermomechanical stresses, resulting from the differential thermal gradients between said portion of the exhaust cone and the exhaust casing. The connection of the acoustic box to the exhaust casing and/or to the exhaust cone is also complex because of the difference in materials and the temperature difference and therefore the generated thermomechanical stresses.

SUMMARY OF THE INVENTION

The present disclosure suggests using an assembly of the annular box to the exhaust cone that is more reliable and more robust to thermal gradients thanks to the mere connection thereof to either one of the aforementioned parts.

For this purpose, the present disclosure provides a first assembly for a turbine of a turbomachine with a longitudinal axis comprising:
  an exhaust cone comprising an outer annular wall for the flow of a primary airflow and an annular box arranged radially inside said outer annular wall,
  an exhaust casing arranged upstream of the exhaust cone and connected to the latter, and wherein one end of the outer annular wall or one end of the annular box is free to move relative to the exhaust cone or to the exhaust casing.

The annular box may be an acoustic annular box allowing reducing sound emissions.

Thus, the outer annular wall of the exhaust cone or the annular box can move at least axially by the effect of the thermal expansions without any risk of break-up and/or while limiting the level of thermomechanical stresses at the origin of damage or break-up. This allows limiting the impact of the differences in materials and/or of the temperature differences between the annular box, the exhaust cone and the exhaust casing. Hence, the present disclosure provides an architecture enabling a free, axial and radial, expansion of the outer annular wall with respect to the annular box through a decoupling, located upstream or downstream of the exhaust cone, between the annular box and the external annular wall.

In the present disclosure, upstream and downstream are defined with respect to the air inlet and outlet of the turbine, upstream corresponding to the air inlet and downstream to the air outlet. Moreover, the axial direction corresponds to the direction of the axis of revolution of the turbine of the exhaust cone, which corresponds to the axis of rotation of said turbine, and a radial direction is a direction perpendicular, i.e. radial, to the axis of revolution.

In the present disclosure, one end of the outer annular wall or of the annular box may refer to an axially peripheral portion of the outer annular wall or of the annular box.

One end of the outer annular wall or of the annular box free to move relative to the exhaust cone or to the exhaust casing may be one end of the outer annular wall or of the annular box having no mechanical connection with the exhaust cone or the exhaust casing.

According to one embodiment, the annular box may be connected on the one hand to the exhaust cone and on the other hand to the exhaust casing, and the upstream end of the outer annular wall may be free to move, in particular in axial and radial movement, relative to the exhaust casing.

According to this embodiment, the exhaust cone is connected to the exhaust casing via the annular box. The outer annular wall of the exhaust cone may have an upstream end able to move to keep the thermal expansion levels low. This allows limiting the impact of the differences in materials and/or of the thermal gradients between the annular box, the exhaust cone and the exhaust casing.

According to one embodiment, the outer annular wall of the exhaust cone may be connected on the one hand to the exhaust cone and on the other hand to the exhaust casing, and the upstream end of the annular box may be free to move, in particular in axial movement, relative to the exhaust casing.

According to this embodiment, the exhaust cone is connected to the exhaust casing via the outer annular wall. The annular box may have an upstream end able to move to keep the thermal expansion levels low. This allows limiting the impact of the differences in materials and/or of thermal gradients between the annular box, the exhaust cone and the exhaust casing. According to one embodiment, the outer annular wall of the exhaust cone may be connected on the one hand to the exhaust cone and on the other hand to the exhaust casing, and the downstream end of the annular box may be free to move, in particular in axial and radial movement, relative to the exhaust cone.

According to this embodiment, the exhaust cone is connected to the exhaust casing via the outer annular wall. The annular box may have a downstream end able to move to keep the thermal expansion levels low. This allows limiting the impact of the differences in materials and/or of thermal gradients between the annular box, the exhaust cone and the exhaust casing. The annular box may comprise an inner annular wall arranged concentric with the outer annular wall, and the upstream end of the annular box may correspond to the upstream end of the inner annular wall and the downstream end of the annular box may correspond to the downstream end of the inner annular wall.

The annular box may comprise a plurality of partitions extending radially from the inner annular wall of the annular box, in particular in the direction of the outer annular wall, and axially along the inner annular wall. In the case where the box is an acoustic box allowing reducing noise emissions, the partitions thus form acoustic partitions.

According to one embodiment, the first assembly may comprise a connecting member fastened to the exhaust casing and connected to the outer annular wall of the exhaust cone and/or to the annular box.

The fastening member may comprise an annular flange around the longitudinal axis fastened to a corresponding flange of the exhaust casing. In addition, the fastening member may comprise a plurality of flexible fastening lugs circumferentially distributed around the longitudinal axis and connected to the annular flange. The fastening lugs may be connected to the outer annular wall of the exhaust cone and/or to the acoustic box.

The exhaust cone may be made of a ceramic matrix composite material. The outer annular wall may be made of a ceramic matrix composite material.

The annular box, which may be an acoustic annular box, in particular the inner annular wall and the acoustic partitions, may be made of a ceramic matrix composite material. Alternatively, the acoustic partitions may be metallic.

The present disclosure provides a second assembly for a turbine of a turbomachine with a longitudinal axis comprising:
  an exhaust cone comprising an outer annular wall for the flow of a primary airflow and a box arranged comprising an inner annular wall arranged radially inward of said outer annular wall,
  an exhaust casing arranged upstream of the exhaust cone, and
  a connecting member interposed longitudinally between the exhaust casing and the exhaust cone, the connecting member being fastened to the exhaust casing and comprising first flexible fastening lugs distributed circumferentially around the longitudinal axis and second flexible fastening lugs distributed circumferentially around the longitudinal axis.

The first fastening lugs may be connected to an upstream annular portion of the outer annular wall, and the second fastening lugs are connected to an upstream annular portion of the inner annular wall of the box.

This arrangement allows decoupling the connection of the casing to the exhaust cone and to the box by using a connecting member with two fastening lugs. In addition, the connection of the exhaust cone and of the box is achieved by flexible lugs which allow absorbing part of the differential thermal expansions by deformation thereof. This allows limiting the impact of the differences in materials between the box, the exhaust cone and the exhaust casing.

The connecting member of the second assembly may be used as a connecting member of the first assembly.

Each first fastening lug and each second fastening lug may comprise a middle portion arranged between a first end and a second end of said first fastening lug, respectively of said second fastening lug. The central portion may be configured to confer flexibility properties in said first fastening lug, respectively on said second fastening lug. The middle portion may have a thickness different from the thickness of the first and second ends.

In the present disclosure, upstream and downstream are defined with respect to the air inlet and outlet of the turbine, upstream corresponding to the air inlet and downstream to the air outlet. Moreover, the axial direction corresponds to the direction of the axis of revolution of the bladed wheel, which corresponds to the axis of rotation of said bladed wheel, and a radial direction is a direction perpendicular, i.e. radial, to the axis of revolution. Similarly, an axial plane is a plane containing the axis of revolution of the bladed wheel and a radial plane is a plane perpendicular to this axis.

The first fastening lugs may have a stiffness lower than a stiffness of the outer annular wall of the exhaust cone. Thus, the first fastening lugs allow limiting the thermomechanical stresses on the exhaust casing and the box because of deformation thereof. In particular, the lower stiffness of the first fastening lugs may be obtained by material properties and geometric parameters of the first fastening lugs.

The inner annular wall of the box may be made of a metallic material or of a ceramic matrix composite material.

The second fastening lugs may have a stiffness lower than a stiffness of the inner annular wall of the box. Thus, the second fastening lugs allow limiting the thermomechanical stresses on the exhaust casing and the exhaust cone because of deformation thereof. In particular, the lower stiffness of the second fastening lugs may be obtained by material properties and geometric parameters of the second fastening lugs.

The inner annular wall of the box may have a downstream portion connected to a downstream portion of the outer annular wall of the exhaust cone. The downstream portion of the inner annular wall of the casing may be connected, for example by screwing, to the downstream portion of the outer annular wall of the exhaust cone. A downstream connecting member may be fastened on the one hand to the downstream portion of the inner annular wall of the casing and on the other hand to the downstream portion of the outer annular wall of the exhaust cone. The downstream connecting member may be formed by a flexible plate. This enables relative movements between the box and the exhaust cone and reduces the impact of thermomechanical stresses.

Alternatively, the downstream portion of the annular wall may be free. In other words, the downstream portion of the inner annular wall of the box may be devoid of a connection, in particular with the downstream portion of the outer annular wall of the exhaust cone. Thus, the downstream portion of the inner annular wall of the casing is free to move, which enables relative movements between the box and the exhaust cone and reduces the impact of thermomechanical stresses.

The box may be annular. The box may comprise a plurality of acoustic partitions extending radially outward from the inner annular wall of the box. The acoustic partitions may be made of a metallic material or of a ceramic matrix composite material. The box may be an acoustic box. The acoustic box allows limiting noise pollution due to the flow of gases coming out of the turbine.

The number of second fastening lugs may be greater than the number of first fastening lugs. The connecting member may comprise an annular flange extending radially and connected to the exhaust casing, the first fastening lugs and the second fastening lugs being connected to said annular flange. The annular flange may be connected to a corresponding annular flange of the exhaust casing.

The first fastening lugs and the second fastening lugs may be connected to a radially outer annular portion of the annular flange. The first fastening lugs and the second fastening lugs may be connected to a radially outer end of the annular flange.

The first fastening lugs and the second fastening lugs may be connected to a radially inner annular portion of the annular flange. The first fastening lugs and the second fastening lugs may be connected to a radially inner end of the annular flange.

The first fastening lugs and the second fastening lugs may extend perpendicularly to the annular flange of the connecting member.

Each of the first fastening lugs may be spaced apart circumferentially from one of the second fastening lugs. Thus, the first fastening lugs and the second fastening lugs may be distributed circumferentially, for example evenly, around the longitudinal axis.

Each of the second fastening lugs may have a first end connected to said annular flange and each of the first fastening lugs may have a first end connected to the first end of one of the second fastening lugs. Several ones, in particular two, of the first fastening lugs may be connected to a first end of one single second fastening lug.

In the text, connecting one part to another or fastening one part to another means fastening the parts together by a mechanical means (screwing, welding in particular) or creating a one-piece connection so that the two parts are secured to each other.

The first fastening lugs may be connected to a radially outer annular portion, in particular to one end, of the annular flange and the second fastening lugs may be connected to a radially inner annular portion, in particular to one end, of the annular flange. Thus, the first fastening lugs and the second fastening lugs are better decoupled.

Each of the first fastening lugs may have a first end connected to the annular flange and a second end connected to the upstream annular portion of the outer annular wall of the exhaust cone, and each of the second fastening lugs may have a first end connected at the second end of one of the first fastening lugs and a second end connected to the upstream annular portion of the inner annular wall of the box.

The first end of each second fastening lug may be connected by screwing to the second end of one amongst the first fastening lugs.

The first end of each second fastening lug may be coincident with the second end of one of the first fastening lugs, so that the first fastening lug and the second fastening lug form one piece.

The second end of each of the second fastening lugs may be arranged upstream of, and radially inward with respect to, the first end of said second fastening lug.

The second end of each of the second fastening lugs may be arranged downstream of, and radially inward with respect to, the first end of said second fastening lug.

Each first end of one of the first fastening lugs may be connected to a radially outer annular portion, in particular one end, of the annular flange.

Each of the second fastening lugs may have a first end connected to the annular flange and a second end connected to the upstream annular portion of the inner annular wall of the box, and each of the first fastening lugs may have a first end connected to the second end of one of the second fastening lugs and a second end connected to the upstream annular portion of the outer annular wall.

The first end of each first fastening lug may be connected by screwing to the second end of one of the second fastening lugs.

The first end of each first fastening lug may be coincident with the second end of one amongst the second fastening lugs, so that the first fastening lug and the second fastening lug form one piece.

The second end of each of the first fastening lugs may be arranged upstream of, and radially outward with respect to, the first end of said first fastening lug.

The second end of each of the first fastening lugs may be arranged downstream of, and radially outward with respect to, the first end of said first fastening lug.

Each first end of the second fastening lugs may be connected to a radially inner annular portion, in particular one end, of the annular flange.

At least one, in particular each, of the first fastening lugs may extend radially outwards and in a first way of the circumferential direction around the longitudinal axis.

At least one, in particular each, of the first fastening lugs may extend radially outwards and in a second way of the circumferential direction around the longitudinal axis opposite to the first way.

Each first fastening lug extending in the first way may be alternated with a first fastening lug extending in the second way. The first end of each first fastening lug extending in the first way may be arranged adjacent to the first end of a first fastening lug extending in the second way. The exhaust cone, in particular the outer annular wall of the exhaust cone, may be made of a ceramic matrix composite material. The exhaust casing may be made of a metallic material. The connecting member may be made of a metallic material.

The upstream annular end of the outer annular wall of the exhaust cone may be longitudinally aligned with an annular shroud of the exhaust housing. This shroud externally delimits an inner annular surface for the flow of the primary airflow coming out of the turbine.

The present disclosure also relates to a turbine comprising the first or second assembly of the aforementioned type.

BRIEF DESCRIPTION OF THE FIGURES

FIG. 5 is a schematic representation of a side view of a second example of assembly of an exhaust cone to an exhaust casing.

DETAILED DESCRIPTION OF THE INVENTION

Figure 1:
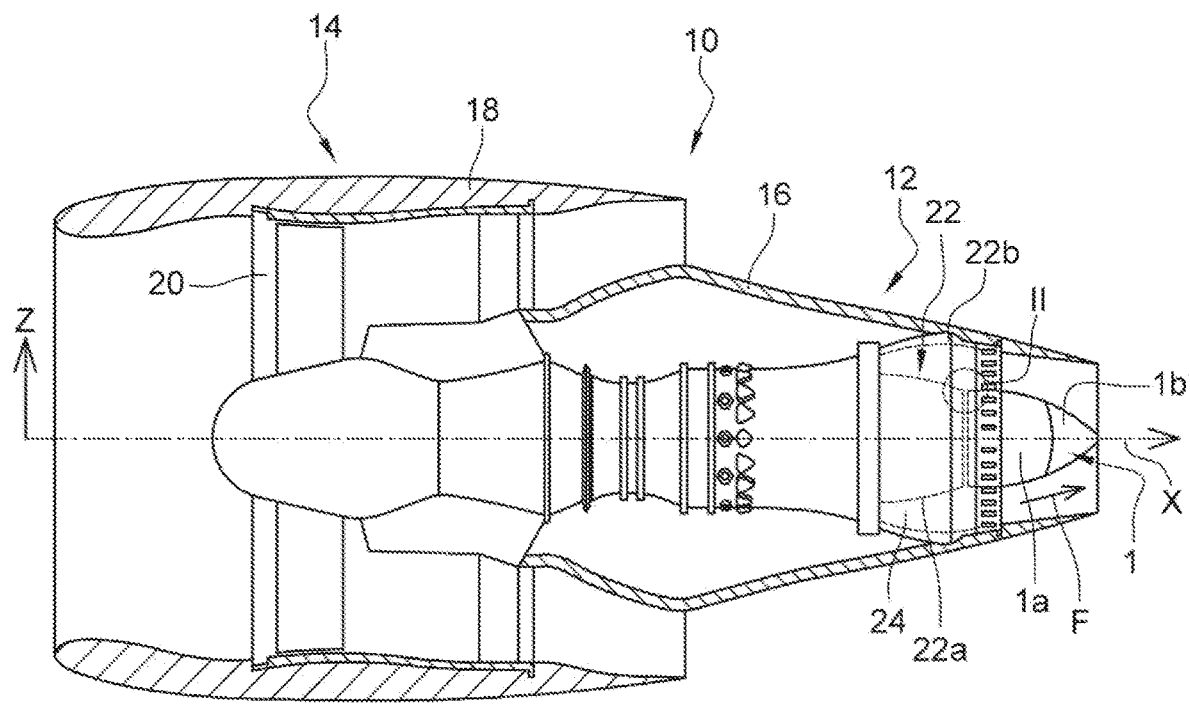
FIG. 1, already described, represents a schematic profile section of a turbomachine for an aircraft.
Figure 2:
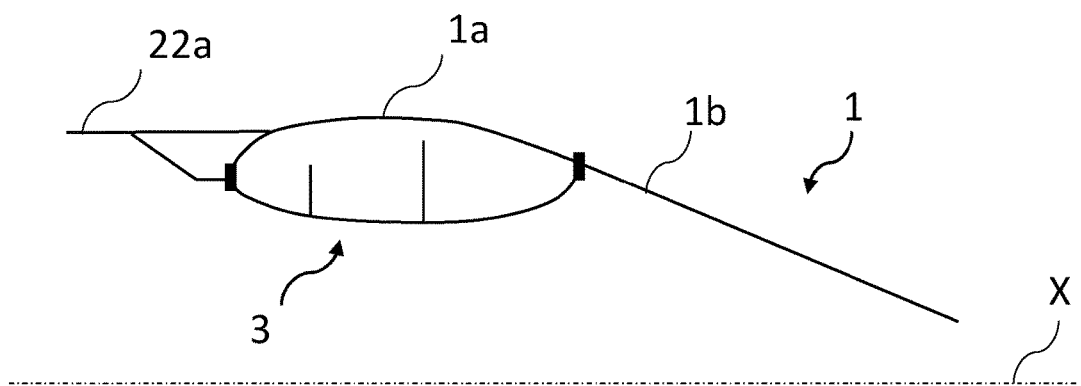
FIG. 2, already described, represents a schematic side view of a downstream portion of the turbomachine of FIG. 1.
Figure 3:
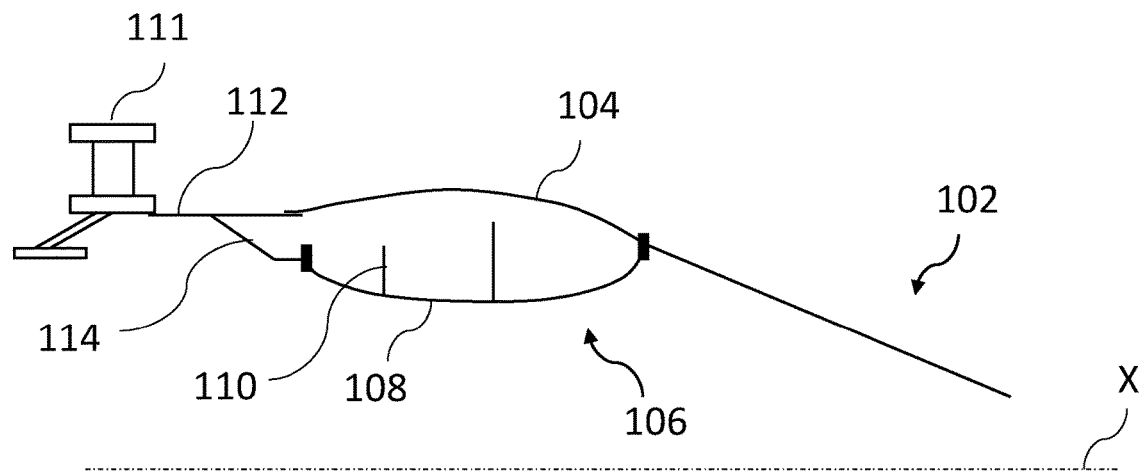
FIG. 3 is a schematic representation of a side view of a first example of assembly of an exhaust cone to an exhaust casing.

Referring to FIG. 3, the exhaust cone 102 may be the exhaust cone 1 of the turbomachine 1 of FIG. 1 and comprises an outer annular wall 104 around a longitudinal axis X and forming a flow path of the primary flow at the outlet of a turbine arranged upstream of the exhaust cone 102. The exhaust cone 102 is made of a ceramic matrix composite material whereas the outer annular wall 104 is made of a ceramic matrix composite material.

An acoustic annular box 106 is further disposed in the exhaust cone 102 to absorb part of the noise generated by the turbomachine comprising the exhaust cone 102. The acoustic box 106 comprises an inner annular wall 108 arranged in the outer annular wall 104 of the exhaust cone 102. The acoustic box 106 also comprises a plurality of partitions 110 extending radially from the inner annular wall 108 of the acoustic box 106 and axially along the wall 108.

The inner annular wall 108 and/or the acoustic partitions are made of a ceramic matrix composite material or of a metallic material.

The inner annular wall 108 is fastened for example by screwing to the exhaust cone 102 and is connected to a shroud 112 of an exhaust casing 111 of the turbomachine. The shroud 112 of the exhaust casing 111 is arranged in the continuity of the outer annular wall 104 so as to define an upstream portion of the flow path of the primary flow coming out of the turbine.

The inner annular wall 108 is connected to the shroud 112 of the exhaust casing 111 via a connecting member 114.

The outer annular wall 104 is connected at its downstream end to the exhaust cone 102. The upstream end of the outer annular wall 104 has no mechanical connection and it is free to move, in particular in axial and radial movement, relative to the shroud 112, namely relative to the exhaust casing. The upstream end of the outer annular wall 104 is arranged in sliding contact with the shroud 112.

The outer annular wall 104 of the ejection cone 102 has an upstream end able to move axially and radially when the thermal expansions are significant. This allows limiting the impact of the differences in materials and/or thermal gradients between the acoustic box, the exhaust cone and the exhaust casing.

Figure 4:
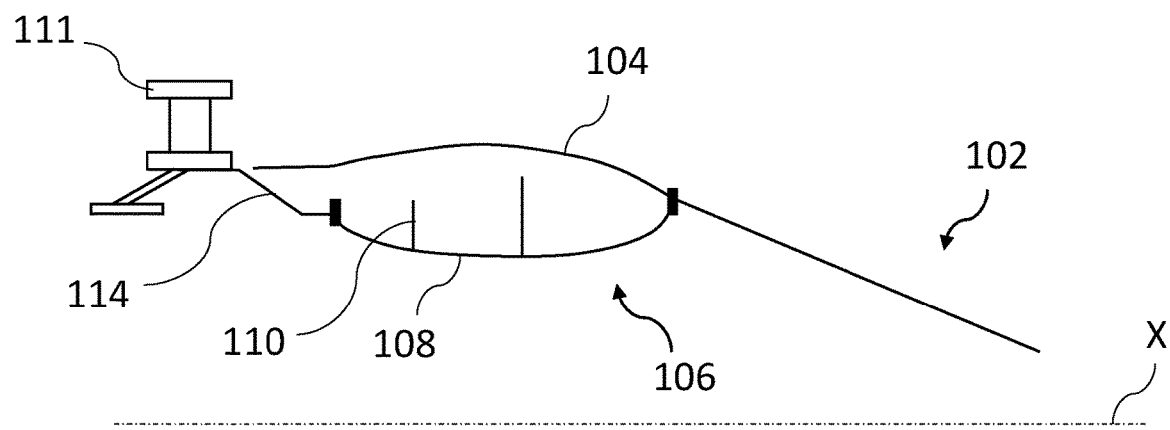
FIG. 4 is a schematic representation of a side view of a variant of the first example of assembly of an exhaust cone to the exhaust casing.

In the variant represented in FIG. 4, the outer annular wall 104 may also have an upstream end extending up to the exhaust casing 111. In this case, the shroud 112 is not necessary and the connecting member 114 is directly attached to the exhaust casing 111, in particular to a flange of the exhaust casing 111. Thus, the upstream end of the outer annular wall 104 is free of contact. The outer annular wall 104 then defines the upstream portion of the flow path of the primary flow coming out of the turbine.

Figure 5:
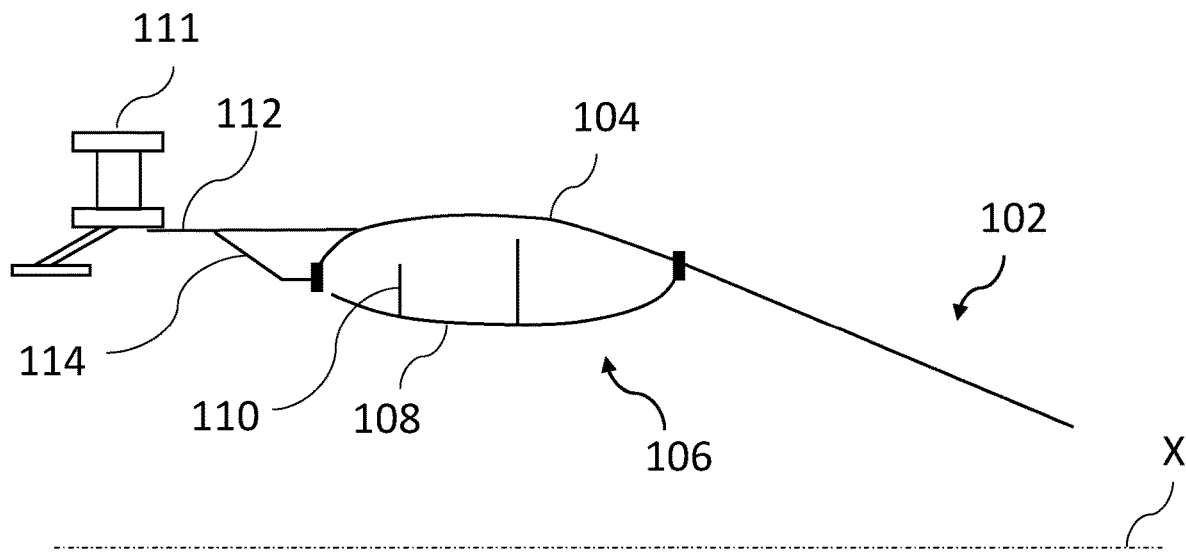
[FIG. 5]

In the variant represented in FIG. 5, the upstream end of the outer annular wall 104 is connected to the connecting member 114 whereas the upstream end of the inner annular wall 108 of the acoustic box 106 has no connection with said connecting member 114. The upstream end of the inner annular wall 108 of the acoustic box 106 is free to move, in particular in axial and radial movement, relative to the shroud 112, namely relative to the exhaust casing. The inner annular wall 108 of the acoustic box 106 has an upstream end able to move axially and radially when the thermal expansions are significant. This allows limiting the impact of the differences in materials and/or thermal gradients between the acoustic box, the exhaust cone and the exhaust casing.

In this variant, the exhaust cone 102 is connected to the exhaust casing 111 through the outer annular wall 104.

Figure 6:
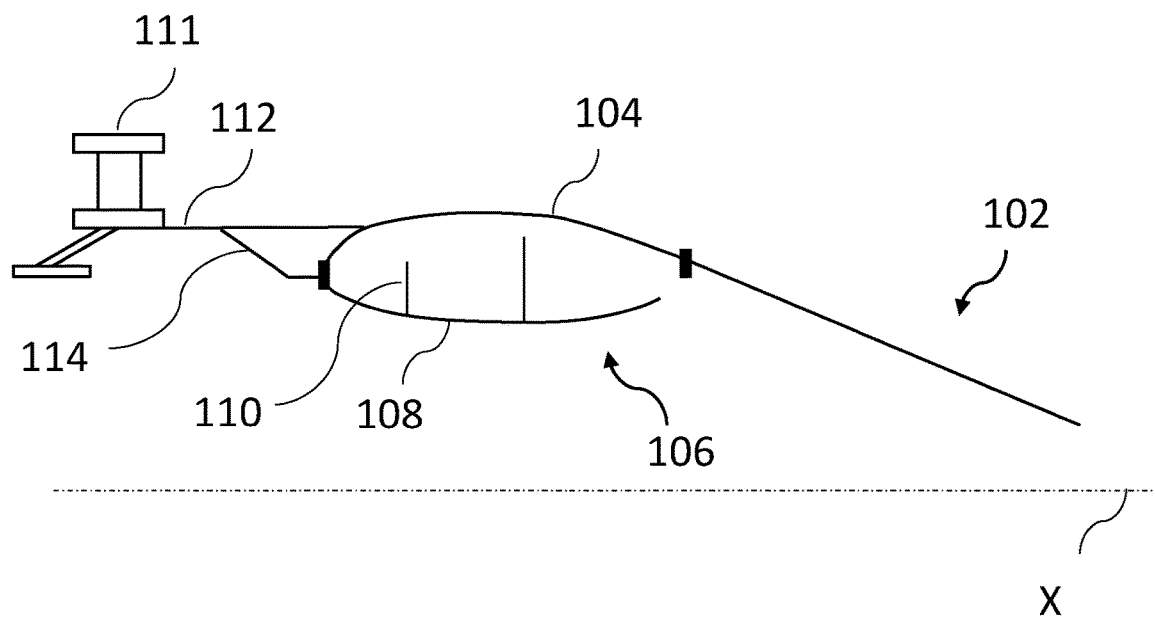
FIG. 6 is a schematic representation of a side view of a third example of assembly of an exhaust cone to an exhaust casing.

In the variant represented in FIG. 6, the upstream end of the outer annular wall 104 is connected to the connecting member 114 and the upstream end of the inner annular wall 108 of the acoustic box 106 is also connected to the connecting member 114. In turn, the downstream end of the inner annular wall 108 of the acoustic box 106 has no connection with the exhaust cone 102. The downstream end of the inner annular wall 108 of the acoustic box 106 is free to move, in particular in axial and radial movement, relative to the exhaust cone 102.

The inner annular wall 108 of the acoustic box 106 has a downstream end able to move axially and radially when the thermal expansions are significant. This allows limiting the impact of the differences in materials and/or thermal gradients between the acoustic box, the exhaust cone and the exhaust casing.

In this variant, the exhaust cone 102 is connected to the exhaust casing 111 via the outer annular wall 104.

While the present description has been made with reference to an acoustic annular box, it also applies to an annular box that is not necessarily acoustic.

Figure 7:
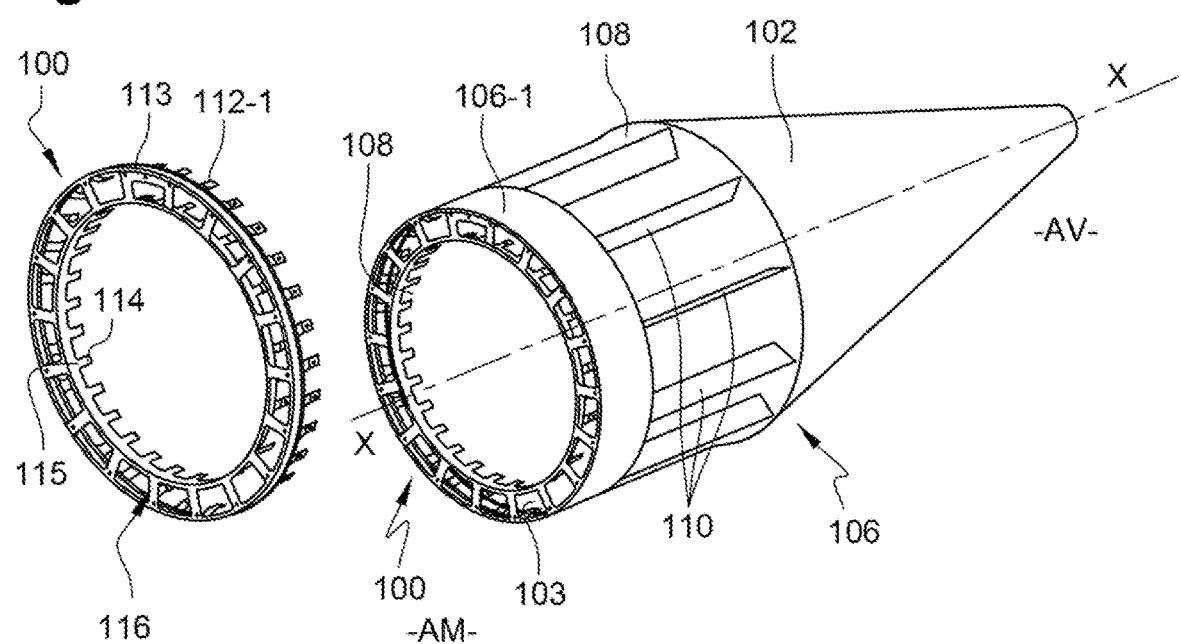
FIGS. 7a and 7b respectively represent a schematic perspective view of a first example of a connecting member and a schematic perspective view of an exhaust cone equipped with the first example of a connecting member.

FIG. 7 represents an upstream portion of a turbomachine turbine for example the turbomachine of FIG. 1. The turbomachine comprises a gas exhaust cone 102 comprising an outer annular wall 104 delimiting a flow path for a primary airflow coming out of the turbine. A shroud 106-1 is arranged upstream AM of the outer annular wall arranged in the continuity of an exhaust casing not represented in FIG. 7 and of an outer annular wall 104 of the exhaust cone 102 and delimiting an annular surface for the flow of the primary airflow coming out of the turbine. A box 106 is arranged in the exhaust cone 102 and is configured to absorb part of the noise generated by the turbomachine. The box 106 comprises an inner annular wall 108 arranged concentric with the outer annular wall 104 of the exhaust cone 102. The box 106 comprises partitions 110 extending radially from the inner annular wall 108 in the direction of the outer annular wall 104.

The outer annular wall 104 of the exhaust cone 102 is made of a ceramic matrix composite material or of metal. The box 106, in particular the inner annular wall 108 and the partitions 110 are made of a ceramic matrix composite material or of metal.

A connecting member 100 is intended to fasten the exhaust cone 102 and box 106 assembly to the exhaust casing. The connecting member 100 comprises a plurality of first fastening lugs 112-1 and second flexible fastening lugs 114-1 distributed circumferentially around the longitudinal axis X.

The connecting member comprises an annular flange 116 extending radially and comprising orifices to be fastened to the exhaust casing in particular to a corresponding flange of the exhaust casing.

A first end of each first fastening lug 112-1 is connected to a radially outer end of the annular flange 116 via an outer annular portion 113. A first end of each second fastening lug 114-1 is connected to a radially inner end of the annular flange 116 via an inner annular portion 115.

A second end of each first fastening lug 112-1 is connected, by screwing, to an upstream end 103 of the exhaust cone 102, in particular to an upstream end 103 of the outer annular wall 104 of the exhaust cone 102, and a second end of each second fastening lug 114-1 is connected, by screwing, to the inner annular wall 108 of the box 106.

The annular flange 116 is formed by a plurality of beams 117 distributed circumferentially around the longitudinal axis X and connecting the outer annular portion 113 and the inner annular portion 115. Alternatively, the annular flange may be solid and include holes to be assembled by screwing to the shroud 106-1 of the exhaust casing.

The second end of each first fastening lug 112-1 is arranged radially inward, namely in the direction of the longitudinal axis X with respect to the first end of said first fastening lug 112-1. The first fastening lugs ensure the connection of the exhaust cone 102 to the exhaust casing and the second fastening lugs ensure the connection of the box 106 to the exhaust casing. The first fastening lugs and the second fastening lugs are flexible and decoupled. Thus, they allow absorbing part of the thermodynamic stresses due to the difference in materials, on the one hand, between the exhaust cone and the exhaust casing and, on the other hand, between the box and the exhaust casing. The connecting lugs also allow absorbing part of the thermodynamic stresses undergone by the outer annular wall and the box because of their differential thermal expansions.

Figure 8:
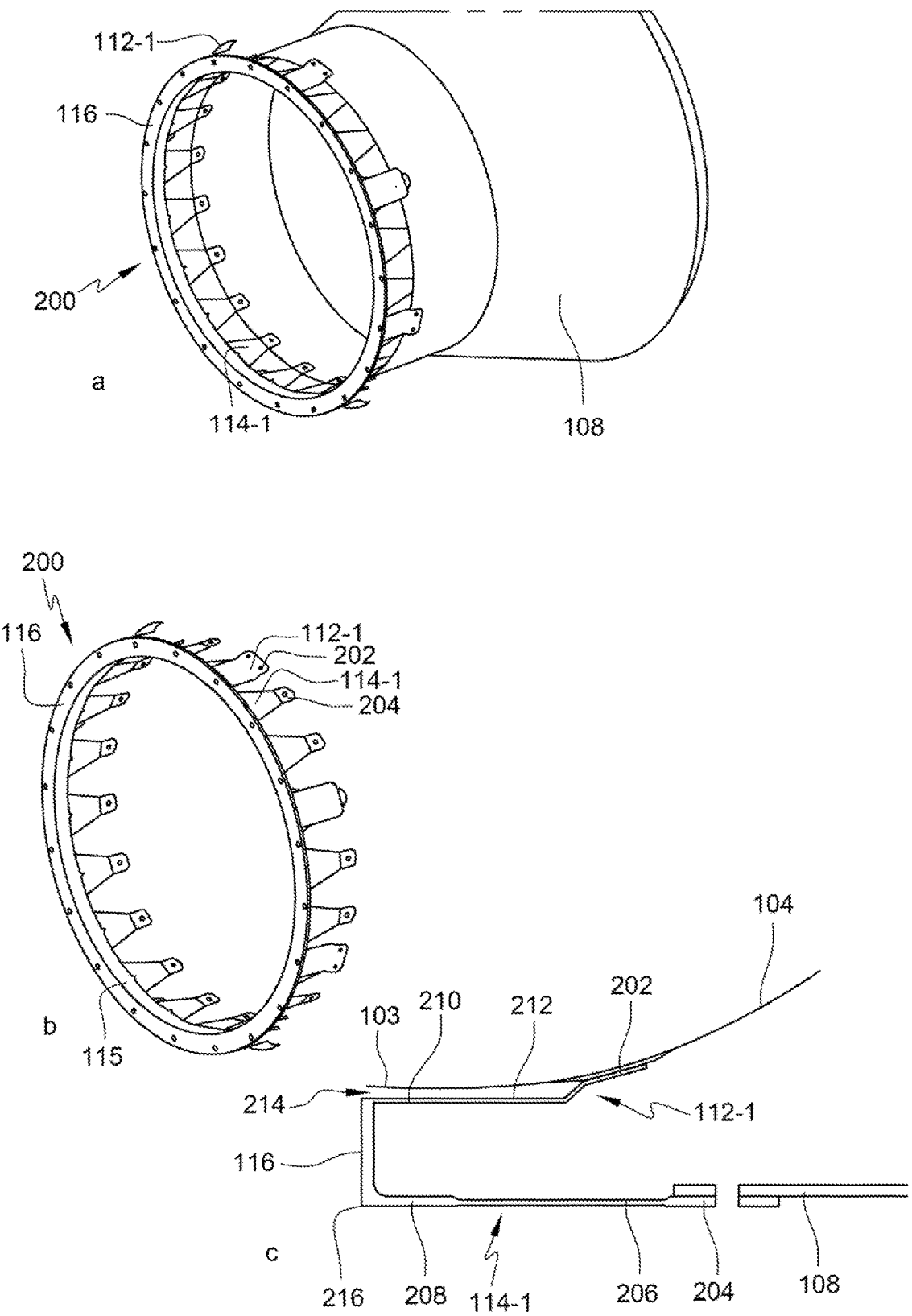
FIGS. 8a, 8b and 8c respectively represent a schematic perspective view of the exhaust cone equipped with a second example of a connecting member, a schematic perspective view of the second example of a connecting member and a schematic side sectional view of the second connecting member.

Referring to FIG. 8, the connecting member 200 comprises the same elements as the connecting member 100. In contrast, the annular flange 116 is formed integrally in one-piece. Each first fastening lug 112-1 is formed by a plate having a second end 202 connected to an upstream portion of the outer annular wall 104 located downstream of the upstream end 103 of the outer annular wall 104. Each first fastening lug 112-1 further comprises a first end 210 directly connected to the annular flange 116, in particular to the radially outer end 214 of the annular flange 116. Each first fastening lug 112-1 comprises a central portion 212 between the second end 202 and the first end 210. The second end 202 is arranged projecting radially outwards with respect to the first end 210. In addition, the second end 202 is longitudinally aligned with first end 210.

The second end 202 has a radial thickness smaller than the radial thickness of the central portion 212 and the radial thickness of the first end 210. This difference in radial thicknesses makes the first fastening lug 112-1 flexible.

Each second fastening lug 114-1 comprises a first end 208 connected to the annular flange 116 via the inner annular portion 115 which extends from the radially inner end 216 of the annular flange 116. Each second fastening lug 114-1 comprises a second end 204 connected by screwing to the inner annular wall 108 of the box 106. Each second fastening lug 114-1 comprises a central portion 206 between the second end 204 and the first end 208.

The central portion 206 has a radial thickness smaller than the radial thickness of the first end 208 and the radial thickness of the second end 204. This difference in radial thicknesses makes the second fastening lug 114-1 flexible.

The second end 204 of each second fastening lug 114-1 has a width in a circumferential direction smaller than a width in the circumferential direction of the first end 208 of the second fastening lug 114-1.

The outer annular wall 104 may extend upstream to ensure continuity with the exhaust casing instead of the shroud 106-1.

The number of first fastening lugs 112-1 may be less than the number of second fastening lugs 114-1. In this case, each first fastening lug 112-1 may be arranged circumferentially opposite one of the second fastening lugs 114-1.

Figure 9:
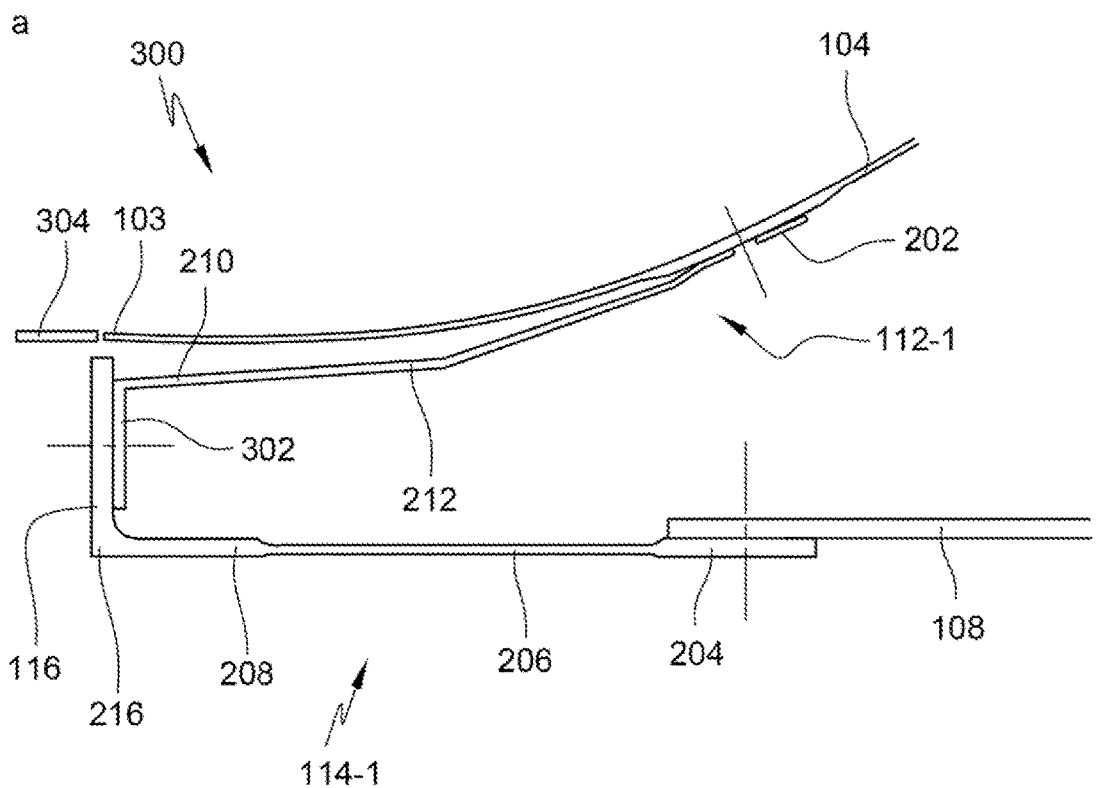
FIGS. 9a and 9b represent a schematic side sectional view of a third example of a connecting member.
Figure 9:
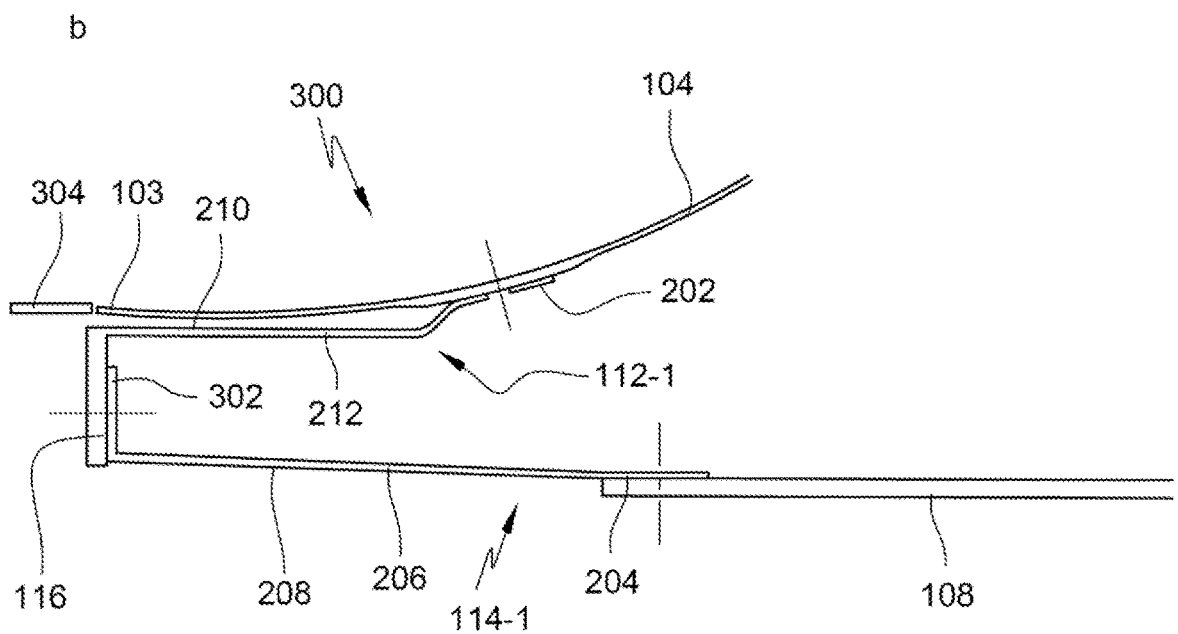

Referring to FIG. 9, the connecting member 300 comprises the same elements as the connecting member 200 of FIG. 8. In contrast, each first fastening lug 112-1 is removable and is connected by screwing to the annular flange 116, in particular in a central portion of the connecting flange 116. Alternatively, each second fastening lug 114-1 is removable and is connected by screwing to the annular flange 116, in particular in a central portion of the connecting flange 116. In this case, each second fastening lug 114-1 has a uniform radial thickness at its first end 208, its second end 204 and its central portion 206.

Thus, the first fastening lugs 112-1 in the case of FIG. 9a or the second fastening lugs 114-1 in the case of FIG. 9b could be replaced more easily.

The upstream annular end 103 of the outer annular wall 104 of the exhaust cone 102 is arranged in continuity with an annular portion 304 of the exhaust casing to form a flow surface for the primary flow coming out of the turbine.

Figure 10:
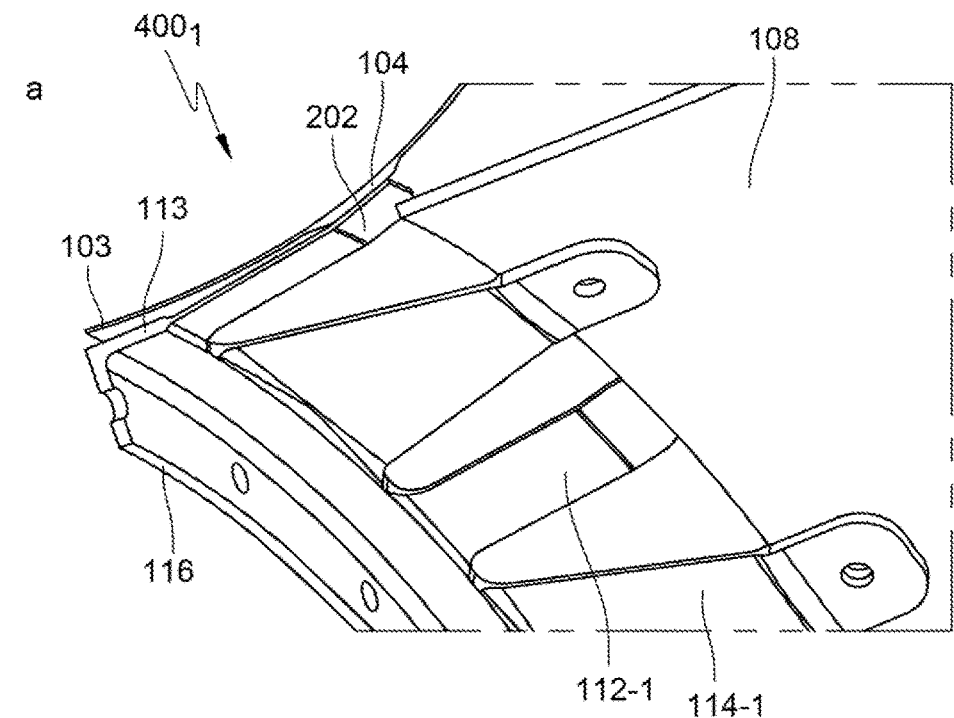
FIGS. 10a and 10b respectively represent a schematic partial perspective view of a fourth example of a connecting member and a schematic side sectional view of the fourth example of a connecting member.
Figure 10:
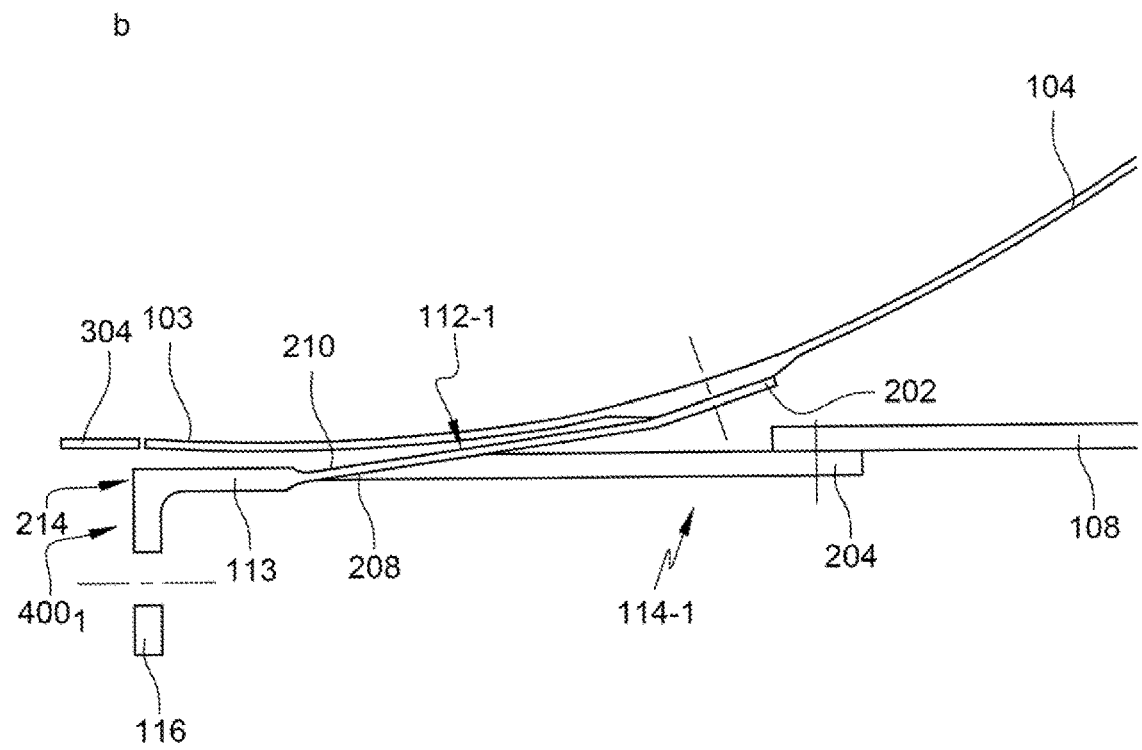

Referring to FIG. 10, the connecting member $400_1$ comprises the same elements as the connecting member 200 of FIG. 8. In contrast, the first fastening lugs 112-1 and the second fastening lugs 114-1 are connected to the radially outer end 214 of the annular flange 116. The first end 210 of each first fastening lug 112-1 extends from the outer annular portion 113 of the annular flange. The first end 210 of each second fastening lug 114-1 also extends from the outer annular portion 113 of the annular flange.

Each first fastening lug 112-1 is interposed with a second fastening lug 114-1. Each first fastening lug 112-1 is also spaced apart circumferentially from the second fastening lugs 114-1 arranged on either side of said first fastening lug 112-1.

Figure 11:
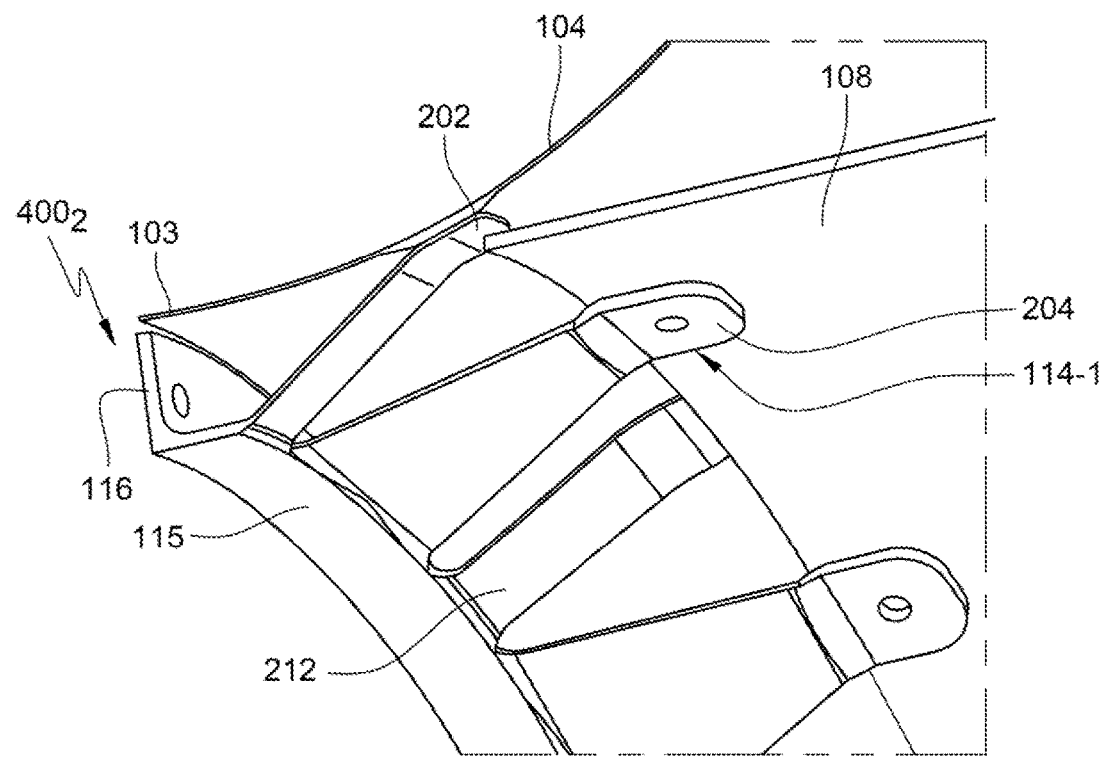
FIGS. 11a and 11b respectively represent a schematic partial perspective view of a fifth example of a connecting member and a schematic side sectional view of the fifth example of a connecting member.
Figure 11:
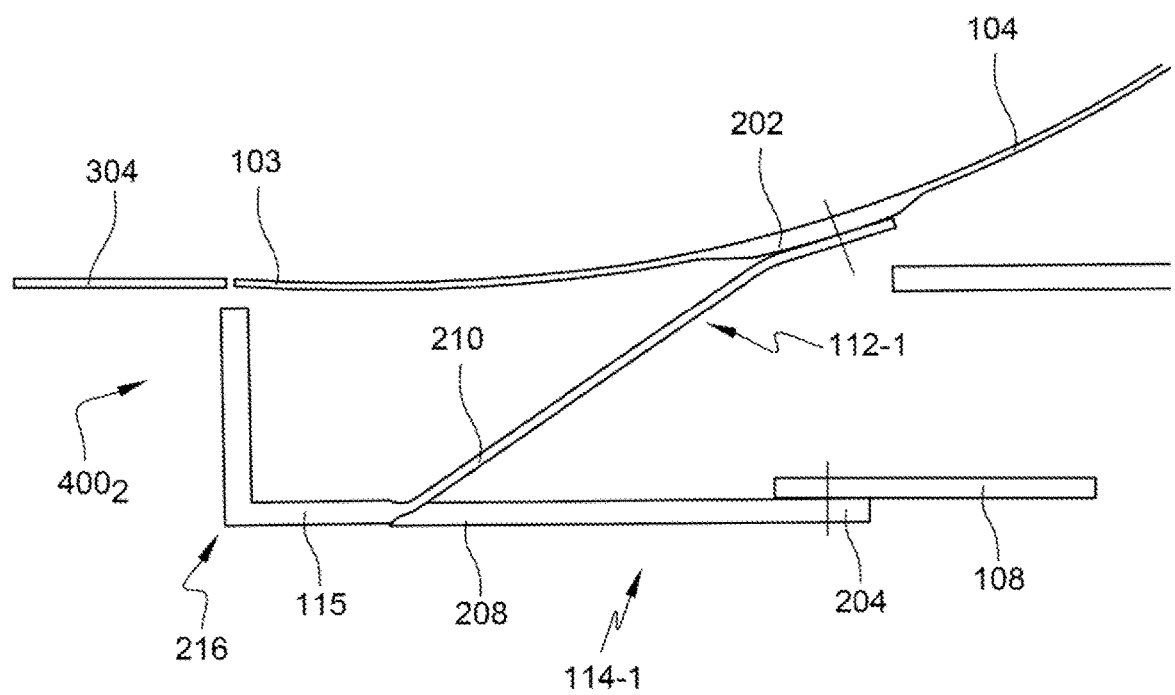

A variant of the connecting member $400_1$ is shown in FIG. 16d, wherein each first fastening lug 112-1 is superimposed with a second fastening lug 114-1. The first end 210 of the first fastening lug 112-1 is screwed to the first end 208 of the second fastening lug superimposed with said first fastening lug 112-1 at the radially outer end 214 of the annular flange 116. Referring to FIG. 11, the connecting member $400_2$ comprises the same elements as the connecting member $400_1$ of FIG. 10. In contrast, the first fastening lugs 112-1 and the second fastening lugs 114-1 are connected to the radially inner end 216 of the annular flange 116. The first end 210 of each first fastening lug 112-1 extends from the inner annular portion 115 of the annular flange 116. The first end 210 of each second fastening lug 114-1 also extends from the outer annular portion 115 of the annular flange 116.

Each first fastening lug 112-1 is interposed with a second fastening lug 114-1. Each first fastening lug 112-1 is also spaced apart circumferentially from the second fastening lugs 114-1 arranged on either side of said first fastening lug 112-1.

A variant of the connecting member $400_2$ is represented in FIG. 16a, wherein each first fastening lug 112-1 is superimposed with a second fastening lug 114-1. The first end 210 of the first fastening lug 112-1 is screwed to the first end 208 of the second fastening lug 114-1 superimposed with said first fastening lug 112-1 at the radially inner end 216 of the annular flange 116.

Each first fastening lug 112-1 as represented in FIG. 16b, may be formed by a plate.

Each first fastening lug 112-1 as represented in FIG. 16c, may be formed by two fingers that are radially disjoint and connected at the first end 210 of the first fastening lug. The fingers have second ends $202_2$ and $202_1$ connected to the outer annular wall 104 of the exhaust cone 102.

Figure 12:
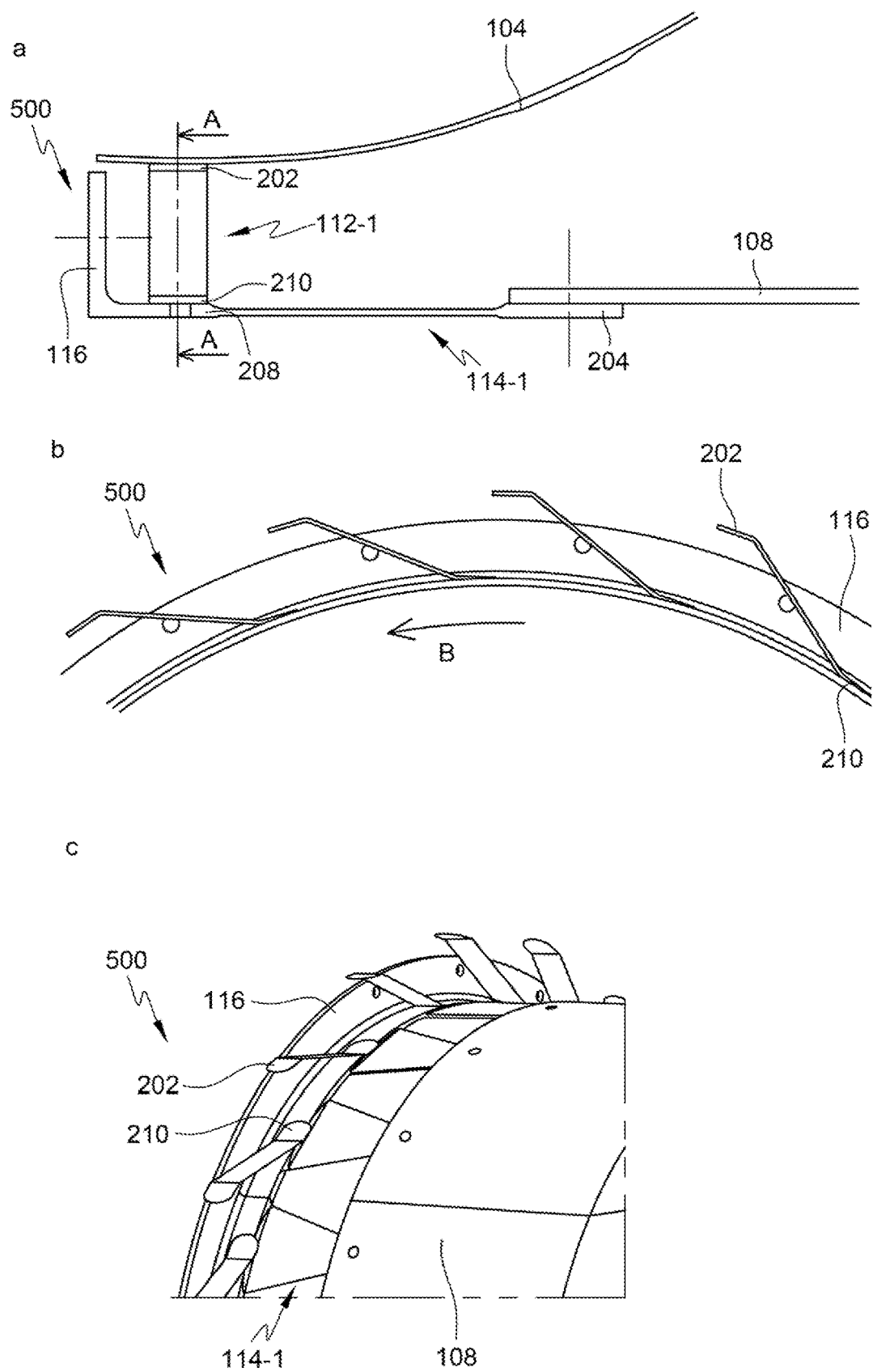
FIGS. 12a, 12b and 12c respectively represent a schematic side sectional view, a schematic front sectional view according to the axis AA and a schematic perspective view of a sixth example of a connecting member.

Referring to FIG. 12, the connecting member 500 comprises the same elements as the connecting member 400. In contrast, each first fastening lug 112-1 extends in a first way of a circumferential direction B around the longitudinal axis X. The second end 202 of each first fastening lug 112-1 is arranged projecting radially with respect to the first end 210 of said first fastening lug 112-1. In addition, the second end 202 of each first fastening lug 112-1 is circumferentially offset with respect to the first end 210 of said first fastening lug 112-1.

Figure 13:
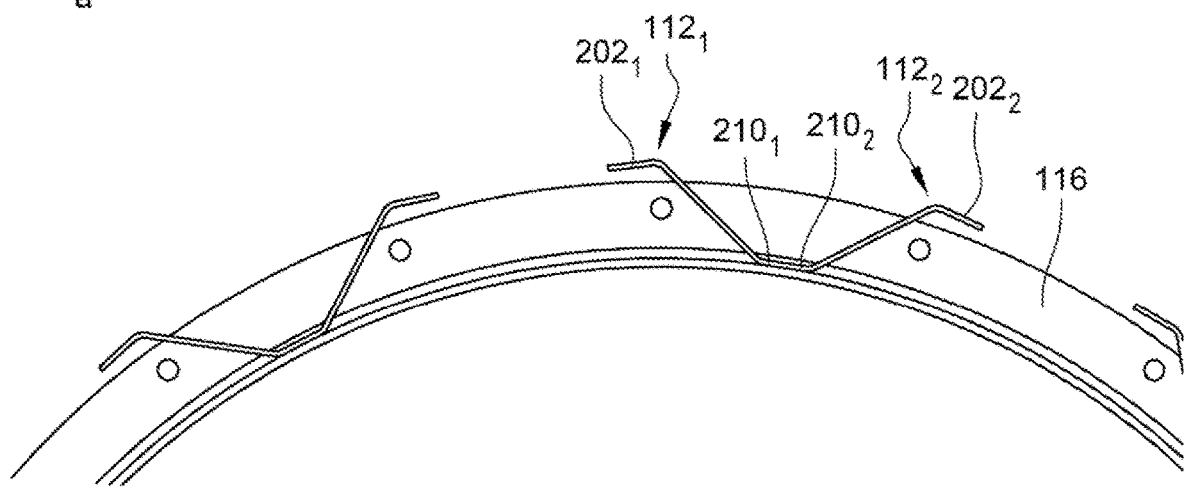
FIGS. 13a and 13b respectively represent a schematic front sectional view and a schematic perspective view of a seventh example of a connecting member.
Figure 13:
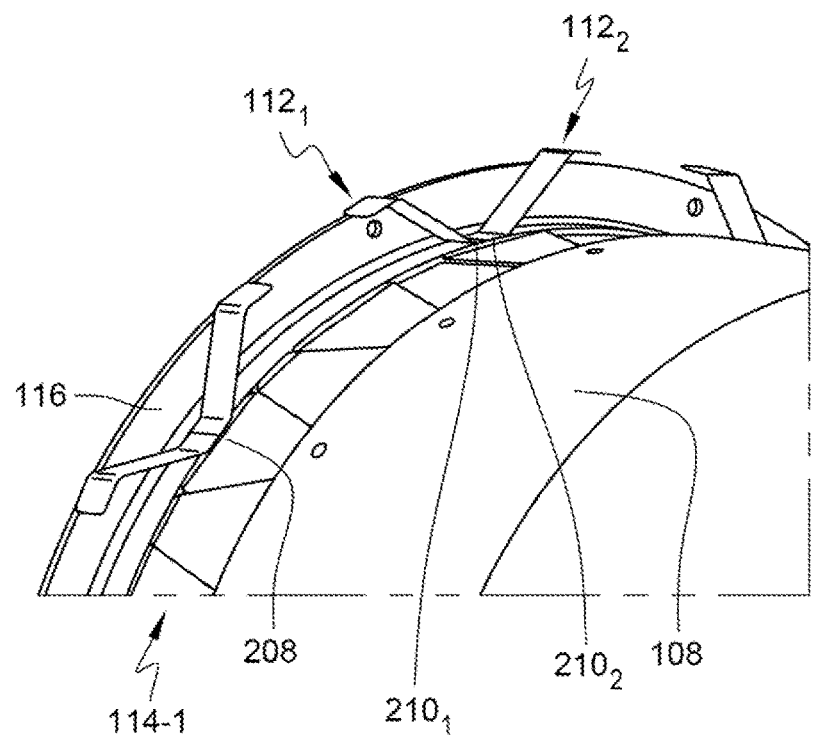

In a variant represented in FIG. 13, the connecting member 500 further comprises at least one first fastening lug $112-1_1$ extending in the first way of the circumferential direction B and at least one first fastening lug $112-1_2$ extending in a second way opposite to the first way of the circumferential direction B. A pair of first fastening lugs $112-1_1$ and $112-1_2$ is arranged head-to-tail. A second end $210_1$ of the first fastening lug $112-1_1$ extending in the first way is adjacent to a second end $210_2$ of the first fastening lug $112-1_2$ extending in the second way. A first end $202_1$ of the first fastening lug $112-1_1$ extending in the first way is opposite to a first end $202_2$ of the first fastening lug $112-1_2$ extending in the second way.

The second end $210_1$ of the first fastening lug $112-1_1$ extending in the first way and the second end $210_2$ of the first fastening lug $112-1_2$ extending in the second way are connected to the same first end 208 of a second fastening lug 114-1.

Figure 14:
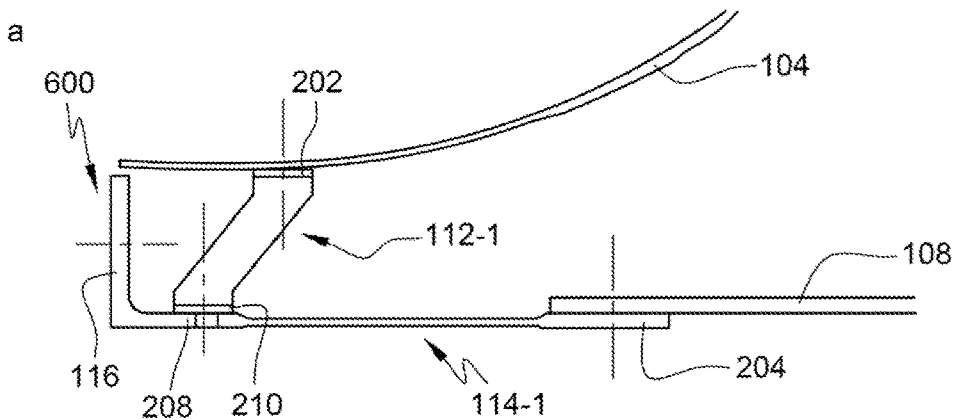
FIGS. 14a and 14b respectively represent a schematic side sectional view and a schematic perspective view of an eighth example of a connecting member.
Figure 14:
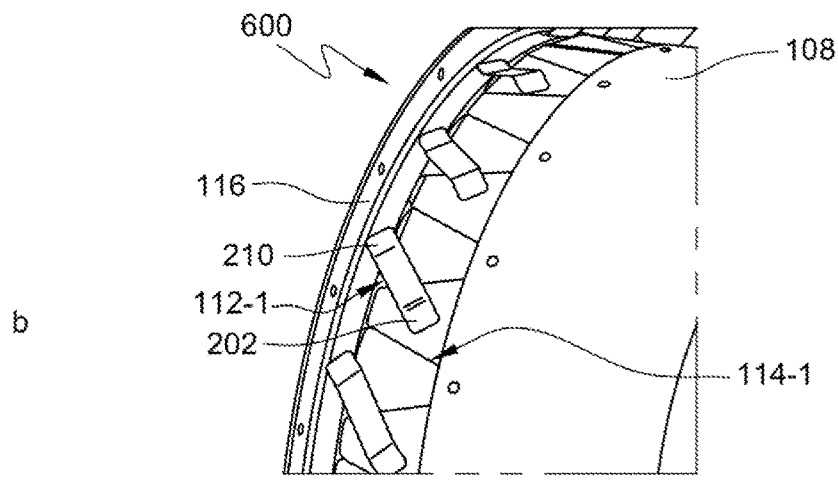

Referring to FIG. 14, the connecting member 600 comprises the same elements as the connecting member 500 of FIG. 12. In contrast, each first fastening lug 112-1 extends simultaneously in the direction of the longitudinal axis X and in the first way of the circumferential direction B. The second end 202 of each first fastening lug 112-1 is circumferentially offset and in the direction of the longitudinal axis X with respect to the first end 210 of said first fastening lug 112-1.

Figure 15:
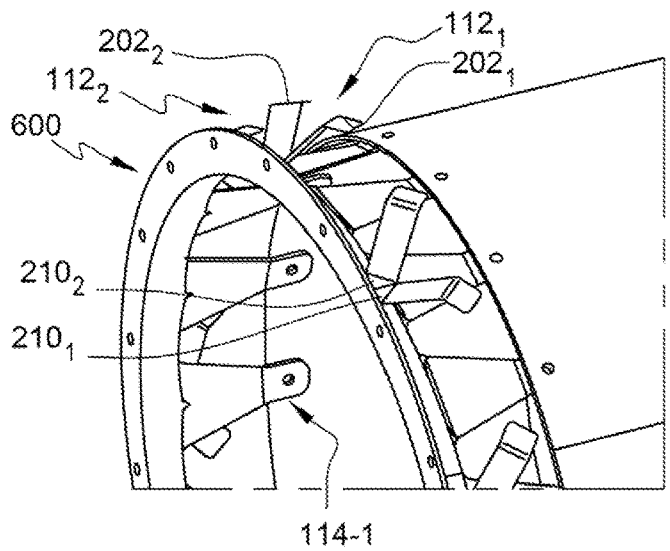
FIG. 15 represents a schematic perspective view of a ninth example of a connecting member.

The variant of the connecting member 600 represented in FIG. 15, comprises the same elements as the connecting member 500 of FIG. 13. In contrast and similarly to the connecting member 600 of FIG. 14, a first fastening lug $112-1_1$ extends simultaneously in the direction of the longitudinal axis X and in the first way of the circumferential direction B and is interposed with a first fastening lug $112-1_2$ extends simultaneously in the direction of the longitudinal axis X and in the second way of the circumferential direction B. The second end $202_1$ and $202_2$ of each first fastening lug $112\text{-}1_1$ and $112\text{-}1_2$ is circumferentially offset and in the direction of the longitudinal axis X with respect to the first end $210_1$ and $210_2$ of said first fastening lug $112\text{-}1_1$ and $112\text{-}1_2$.

Figure 16:
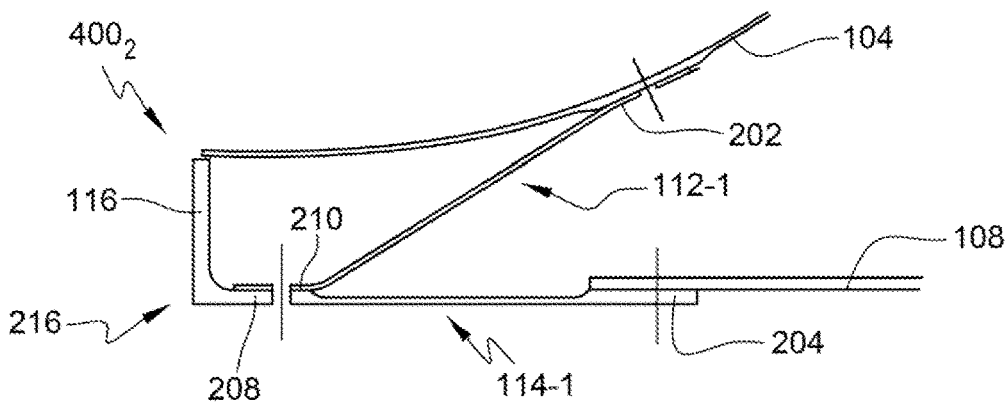
FIGS. 16a and 16d represent schematic side sectional views of a tenth example of a connecting member and FIGS. 16b and 16c represent schematic perspective views of the tenth example of a connecting member.
Figure 16:
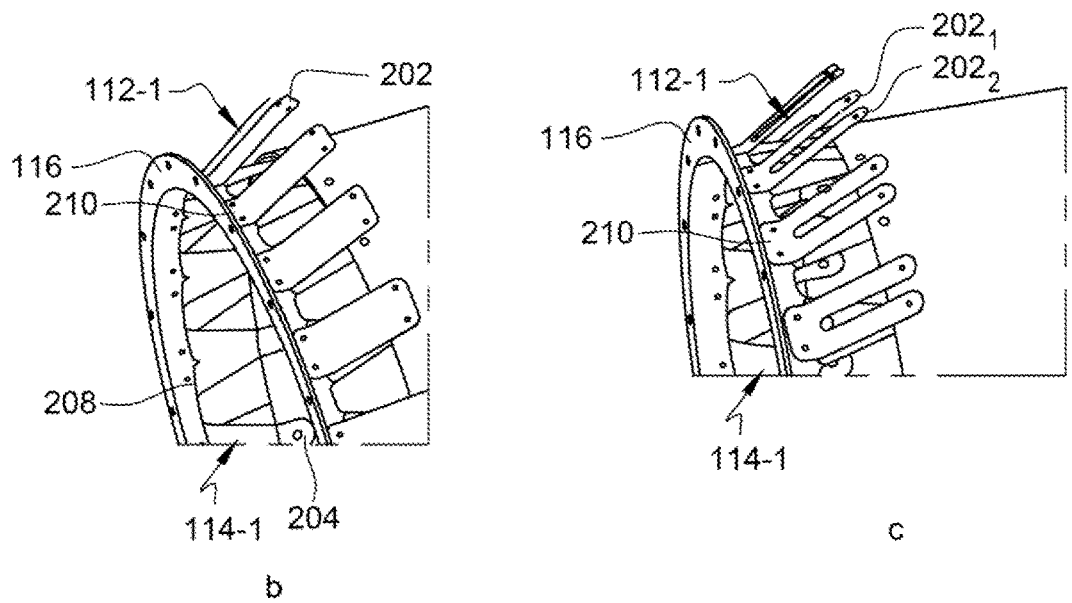
Figure 16:
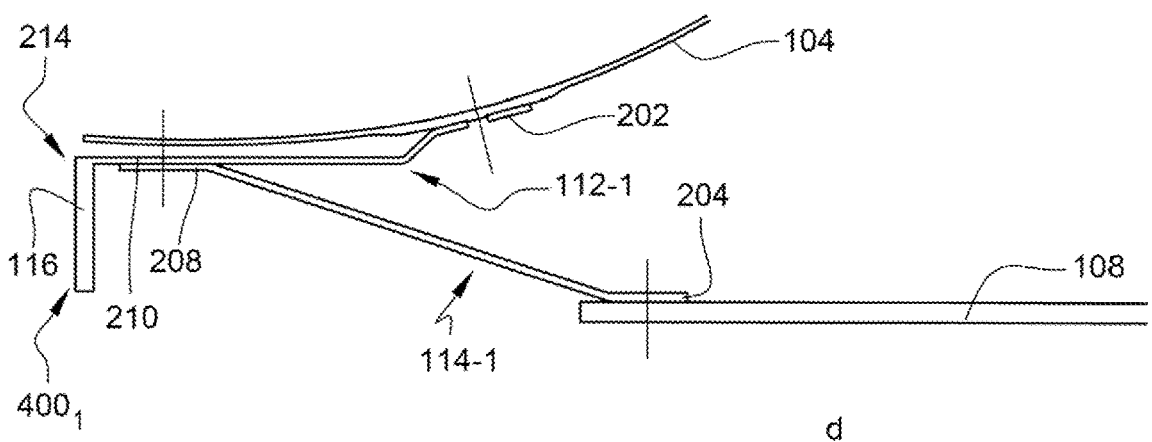
Figure 17:
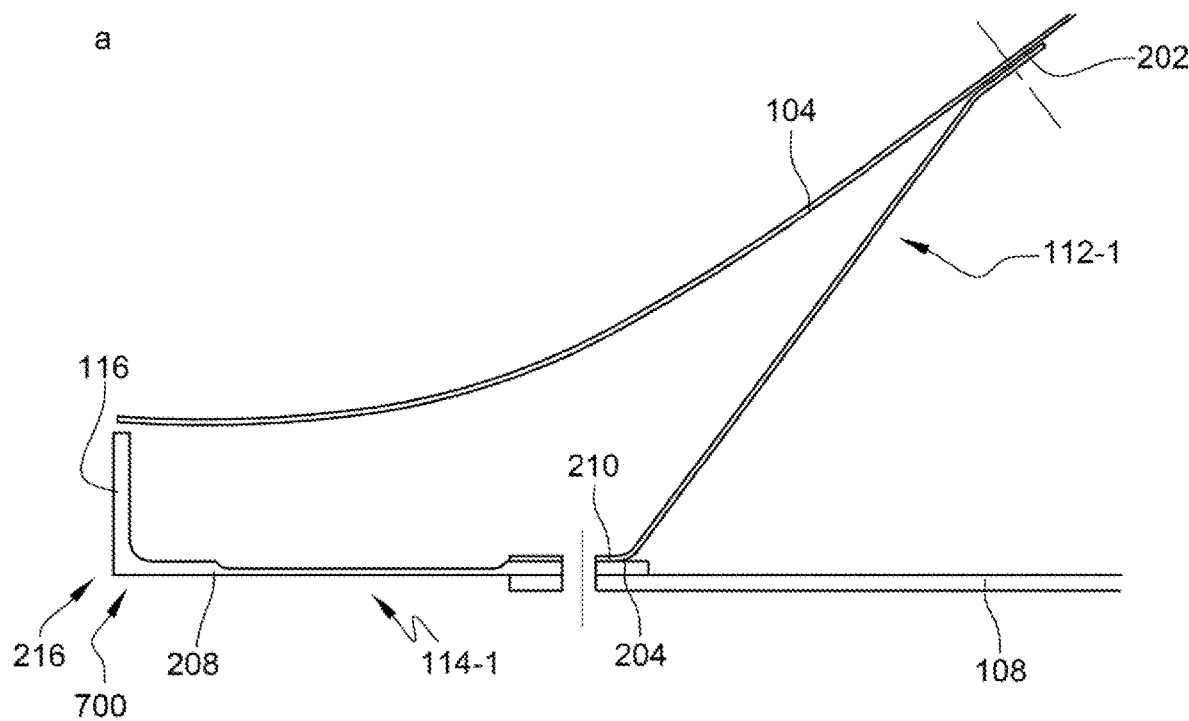
FIGS. 17a and 17b represent schematic side sectional views of an eleventh example of a connecting member.
Figure 17:
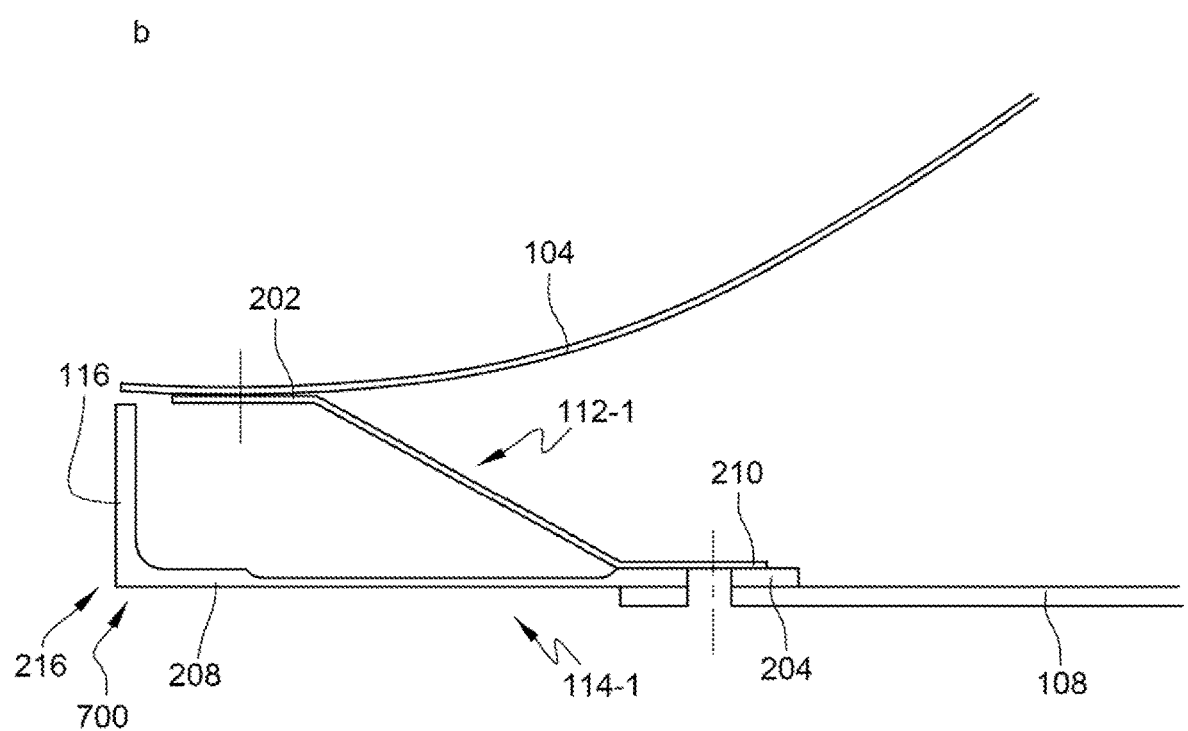

Referring to FIG. 17, the connecting member 700 comprises the same elements as the connecting member $400_2$ of FIG. 16. In contrast, the first end 210 of each first fastening lug 112-1 is fastened by screwing to the second end 204 of a second fastening lug 114-1.

The second end 204 of each second fastening lug 114-1 is connected to the inner annular wall 108.

The second end 202 of each first fastening lug 112-1 is connected to the outer annular wall 104.

The first end 208 of each second fastening lug 114-1 is connected to the annular flange 116 at its radially inner end 216.

In FIG. 17a, the second end 202 of each first fastening lug 112-1 is arranged radially projecting outwards and downstream of the first end 210 of said first fastening lug 112-1.

In FIG. 17b, the second end 202 of each first fastening lug 112-1 is arranged radially projecting outwards and upstream of the first end 210 of said first fastening lug 112-1.

Figure 19:
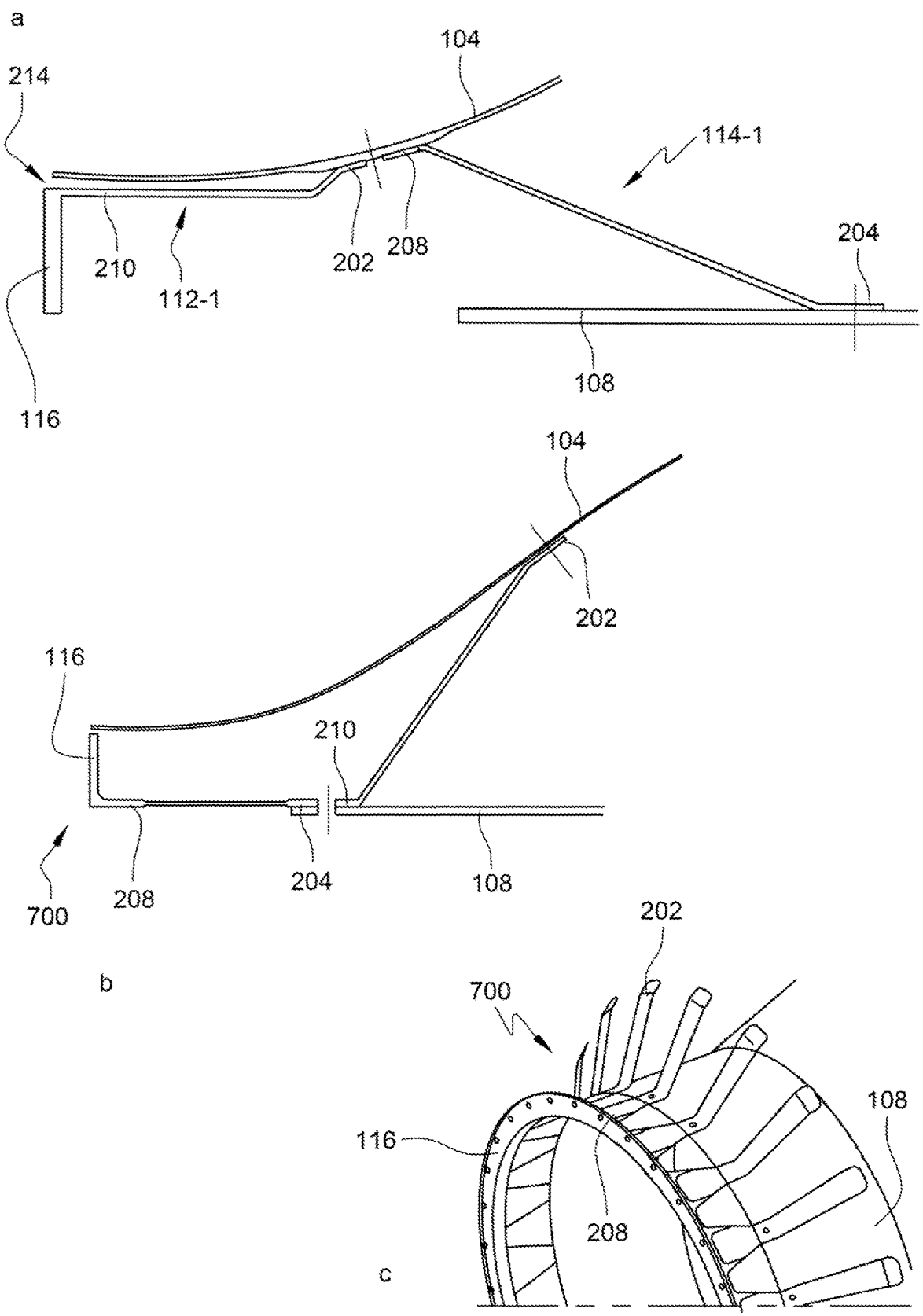
FIGS. 19a and 19b represent schematic side sectional views of a thirteenth example of a connecting member and FIG. 19c represents a schematic perspective view of the thirteenth.

In a variant represented in FIGS. 19b and 19c, the first end 210 of each first fastening lug 112-1 is secured to the second end 204 of a second fastening lug 114-1, so that the first fastening lug 112-1 forms one piece with said second fastening lug 114-1.

Figure 18:
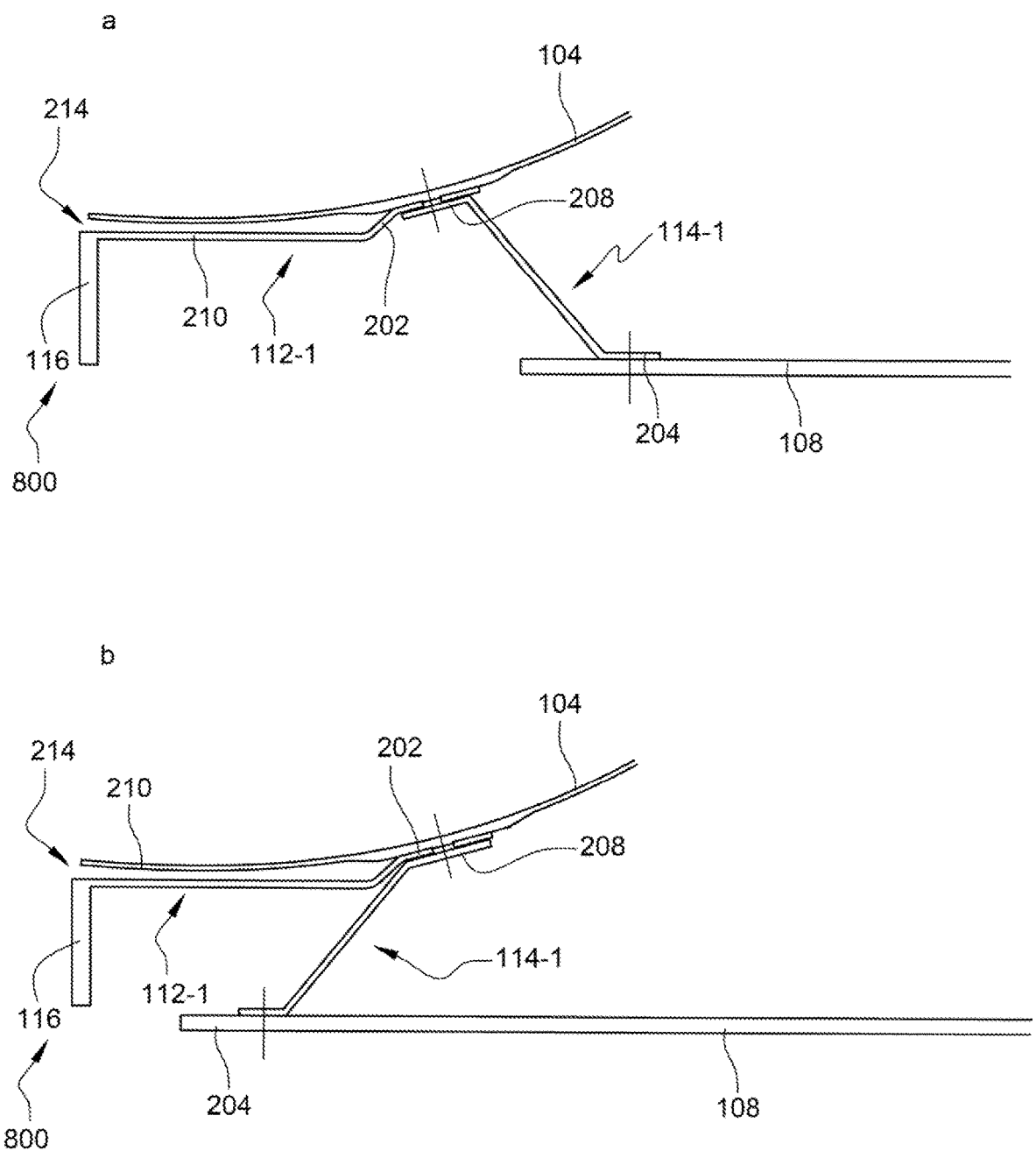
FIGS. 18a and 18b represent schematic side sectional views of a twelfth example of a connecting member.

Referring to FIG. 18, the connecting member 800 comprises the same elements as the connecting member 700 of FIG. 17. In contrast, the first end 208 of each second fastening lug 114-1 is fastened by screwing to the second end 202 of a first fastening lug 112-1.

The second end 210 of each second fastening lug 114-1 is connected to the inner annular wall 108.

The second end 202 of each first fastening lug 112-1 is connected to the outer annular wall 104.

The first end 210 of each first fastening lug 112-1 is connected to the annular flange 116 at its radially outer end 214.

In FIG. 18a, the second end 204 of each second fastening lug 114-1 is arranged projecting radially inward and downstream from the first end 208 of said second fastening lug 114-1.

In FIG. 18b, the second end 204 of each second fastening lug 114-1 is arranged projecting radially inward and upstream from the first end 208 of said second fastening lug 114-1.

In a variant represented in FIG. 19a, the first end 208 of each second fastening lug 114-1 is secured to the second end 202 of a first fastening lug 112-1, so that the first fastening lug 112-1 forms one piece with said second fastening lug 114-1.

The invention claimed is:

1. An assembly for a turbine of a turbomachine with a longitudinal axis, the assembly comprising:
    an exhaust cone comprising an outer annular wall for the flow of a primary airflow and an annular box arranged radially inside the outer annular wall; and
    an exhaust casing arranged upstream of and connected to the exhaust cone,
    wherein the outer annular wall is arranged upstream from a downstream portion of the exhaust cone, and wherein one end of the outer annular wall or one end of the annular box is free and able to move relative to and has no mechanical connection with the downstream portion of the exhaust cone or the exhaust casing,
    wherein the annular box comprises an inner annular wall arranged concentric with the outer annular wall, and the upstream end of the annular box corresponds to the upstream end of the inner annular wall and the downstream end of the annular box corresponds to the downstream end of the inner annular wall,
    wherein:
        the annular box is connected on the one hand to the exhaust cone and on the other hand to the exhaust casing, and wherein the upstream end of the outer annular wall is free to move relative to the exhaust casing, wherein the inner annular wall is connected at its upstream end to a shroud of the exhaust casing and at its downstream end to the exhaust cone, the outer annular wall is connected at its downstream end to the exhaust cone and the upstream end of the outer annular wall has no mechanical connection and is free to move in axial and radial movement relative to the shroud of the exhaust casing, and wherein the upstream end of the outer annular wall is arranged in sliding contact with the shroud of the exhaust casing; or
        the outer annular wall of the exhaust cone is connected on the one hand to the downstream portion of the exhaust cone and on the other hand to the exhaust casing, and wherein the upstream end of the annular box is free to move relative to the exhaust casing, wherein the upstream end of the outer annular wall is connected to the shroud of the exhaust casing whereas the upstream end of the inner annular wall of the annular box has no connection with said shroud of the exhaust casing, and wherein the upstream end of the inner annular wall of the annular box is free to move in axial and radial movement relative to the shroud of the exhaust casing; or
        the outer annular wall of the exhaust cone is connected on the one hand to the downstream portion of the exhaust cone and on the other hand to the exhaust casing, and wherein the downstream end of the annular box is free to move relative to the exhaust cone, wherein the upstream end of the outer annular wall is connected to the shroud of the exhaust casing and the upstream end of the inner annular wall of the annular box is also connected to the shroud of the exhaust casing, wherein the downstream end of the inner annular wall of the annular box has no connection with the exhaust cone, and the downstream end of the inner annular wall of the annular box is free to move, in axial and radial movement, relative to the shroud of the exhaust cone.

2. The assembly according to claim 1, wherein the annular box comprises a plurality of partitions extending radially from the inner annular wall of the annular box and axially along the inner annular wall.

3. The assembly according to claim 1, comprising a connecting member fastened to the exhaust casing and connected to the outer annular wall of the exhaust cone and/or to the annular box.

4. The assembly according to claim 3, wherein the connecting member comprises first flexible fastening lugs distributed circumferentially around the longitudinal axis and second flexible fastening lugs distributed circumferentially around the longitudinal axis, wherein the first fastening lugs are connected to an upstream annular portion of the outer annular wall of the exhaust cone, and the second fastening lugs are connected to an upstream annular portion of the inner annular wall of the box.

5. The assembly according to claim 1, wherein the exhaust cone is made of a ceramic matrix composite material.

6. The assembly according to claim 1, wherein the annular box is made of a ceramic matrix composite material.

7. A turbine comprising the assembly according to claim 1.

* * * * *